United States Patent
Bertolotti et al.

(10) Patent No.: US 11,518,352 B2
(45) Date of Patent: Dec. 6, 2022

(54) METHOD FOR ACTUATING A PARKING BRAKE SYSTEM AND PARKING BRAKE SYSTEM

(71) Applicant: FRENI BREMBO S.P.A., Curno (IT)

(72) Inventors: Andrea Bertolotti, Curno (IT); Walter Canova, Curno (IT); Stefano Dossi, Curno (IT); Tomasz Woloszyn, Curno (IT)

(73) Assignee: Freni Brembo S.p.A., Bergamo (IT)

( * ) Notice: Subject to any disclaimer, the term of this patent is extended or adjusted under 35 U.S.C. 154(b) by 422 days.

(21) Appl. No.: 16/625,916

(22) PCT Filed: Jun. 28, 2017

(86) PCT No.: PCT/IB2017/053863
§ 371 (c)(1),
(2) Date: Dec. 23, 2019

(87) PCT Pub. No.: WO2019/002916
PCT Pub. Date: Jan. 3, 2019

(65) Prior Publication Data
US 2020/0172061 A1    Jun. 4, 2020

(51) Int. Cl.
*B60T 8/17* (2006.01)
*B60T 8/171* (2006.01)

(52) U.S. Cl.
CPC .......... *B60T 8/17* (2013.01); *B60T 8/171* (2013.01); *B60T 2250/00* (2013.01); *B60T 2250/02* (2013.01); *B60T 2270/402* (2013.01)

(58) Field of Classification Search
None
See application file for complete search history.

(56) References Cited

U.S. PATENT DOCUMENTS

| 4,360,083 | A | 11/1982 | Weisman |
| 4,505,363 | A | 3/1985 | Herbulot et al. |
| 4,993,519 | A | 2/1991 | Thioux |
| 6,907,965 | B2 | 6/2005 | Peter |

(Continued)

FOREIGN PATENT DOCUMENTS

| CA | 1130343 A | 8/1982 |
| CN | 2533055 Y | 1/2003 |

(Continued)

OTHER PUBLICATIONS

European Patent Office, International Search Report with Written Opinion, issued in PCT/IB2017/053863, dated Mar. 2, 2018, 11 pages, European Patent Office, Rijwisjk, Netherlands.

*Primary Examiner* — Tamara L Weber
(74) *Attorney, Agent, or Firm* — Marshall & Melhorn, LLC

(57) ABSTRACT

A method for actuating a parking brake system of a vehicle with at least three brake calipers associated with one or more axles of the vehicle is described. The method may include the following steps: providing at least one detection device for detecting the vehicle status, acquiring a value of the vehicle status with the detection device, comparing the detected value with a reference value of the vehicle status, and actuating two brake calipers of the at least three brake calipers if the detected value is lower than the reference value or actuating all the at least three brake calipers if the detected value is equal to or greater than the reference value.

7 Claims, 12 Drawing Sheets

(56) References Cited

U.S. PATENT DOCUMENTS

| | | | |
|---|---|---|---|
| 7,946,396 B2 | 5/2011 | Roberts et al. | |
| 8,037,972 B2 | 10/2011 | Fujita | |
| 8,079,649 B2 | 12/2011 | Eberling | |
| 8,613,345 B1 | 12/2013 | Booher | |
| 8,672,102 B2 | 3/2014 | Walters et al. | |
| 9,266,513 B2 | 2/2016 | Gates et al. | |
| 10,933,846 B2* | 3/2021 | Kinder | B60T 8/245 |
| 2008/0195289 A1* | 8/2008 | Sokoll | B60T 7/122 |
| | | | 701/70 |
| 2008/0217123 A1* | 9/2008 | Fujita | B60W 30/18109 |
| | | | 188/161 |
| 2010/0181823 A1* | 7/2010 | Eberling | B60T 13/683 |
| | | | 303/9.76 |
| 2015/0266459 A1* | 9/2015 | Gates | B60T 7/122 |
| | | | 180/282 |
| 2015/0344007 A1* | 12/2015 | Lee | B60T 13/686 |
| | | | 701/70 |
| 2018/0312152 A1 | 11/2018 | Barbosa et al. | |

FOREIGN PATENT DOCUMENTS

| | | |
|---|---|---|
| CN | 201676887 U | 12/2010 |
| EP | 1231119 A2 | 8/2002 |
| EP | 1862692 B1 | 9/2011 |
| IT | 1157771 B | 2/1987 |
| JP | S59145659 A | 8/1984 |
| WO | 2016/064980 A1 | 4/2016 |

* cited by examiner

METHOD FOR ACTUATING A PARKING BRAKE SYSTEM AND PARKING BRAKE SYSTEM

FIELD OF THE INVENTION

The present invention relates to a method for actuating a parking brake system, as well as to a parking brake system.

BACKGROUND ART

In a braking system, it is generally known to construct a mechanical architecture which includes at least two brake calipers provided in pair on the same disc, in which each caliper is undersized for providing the braking action required, but they are capable of providing the braking force required when they are simultaneously actuated. For example, solutions ascribable to this type of braking system are disclosed in documents EP-1862692, U.S. Pat. Nos. 4,505,363, 4,993,519, CA-1130343, US-2004-159505, U.S. Pat. No. 4,360,083, US-2004-050631, IT-1157771, CN-2016-76887 and CN-2012-2533055. Thereby, the braking torque applied on the brake disc may be increased with respect to known solutions which include one brake caliper alone per brake disc.

Such solutions allow to increase the safety of a service brake, particularly in emergency braking conditions in which it is highly desirable to have an increased braking torque available.

Within the scope of parking brake systems, the possibility of increasing the entity of the braking torque does not necessarily improve the safety of the parking braking. Indeed, the danger of the parking braking arises when the driver, leaving the vehicle, abandons the vehicle with no driver and therefore with no control. In the case of an operating defect of a caliper of the parking brake, such a vehicle is a danger for anyone and anything in the vicinity thereof. The level of risk is further amplified when for example, the vehicle is parked with no driver at the edge of a road with a given slope, or, or in addition to, when the abandoned vehicle is a rather heavy vehicle, with hot brake discs, such as for example a commercial vehicle or an industrial vehicle.

Therefore, the need is strongly felt to increase the safety of a parking brake system.

The need is also felt to minimize the consequences of a failure to the parking brake system of a parked vehicle with no driver.

It is also known to manufacture electric parking brakes in which the brake pads accommodated in the body of the caliper are tightened against the braking surfaces of the brake disc due to the force generated by an electric motor and transmitted with a suitable reduction ratio to the thrust means which are suitable for pressing against the back of the brake pads. Certain examples of brake calipers for electric parking brakes are shown in documents WO-2016-64980, EP-1231119, EP-1219518, EP-1929170, U.S. Pat. Nos. 7,806,241, 5,829,557, 2,217,464 and 4,809,824.

However, the mere provision of an electromechanically- or electrohydraulically-implemented parking brake does not solve the problem because it is not suitable for ensuring the functionality in failure conditions. Moreover, electric parking brake systems generally comprises actuation devices which involve cumbersome cabling for allowing the actuation current flow and for being conveniently isolated.

Therefore, the need to provide a parking brake suitable for obviating the drawbacks of the known art is felt.

The need to reduce the costs for developing a parking brake system is also felt.

SOLUTION

It is an object of the present invention to devise a solution for the needs mentioned hereto with reference to the known art and which simultaneously allows to obviate the drawbacks of the prior art mentioned hereto.

It is an object of the present invention to provide a solution capable of providing an intelligent actuation logic of a parking brake system.

It is an object of the present invention to provide a method for actuating a parking brake suitable for providing diversified actuation controls to one or more brake calipers according to the contingent and specific needs.

It is an object of the present invention to provide a solution to the needs of providing a parking brake system capable of allowing reduced-volume electric wiring which is simultaneously safe and reliable.

It is a further object of the present invention to provide a parking brake system having advantageous installation also on vehicles with low production volumes.

According to one aspect of the invention, a method for actuating a parking brake system of a vehicle comprising at least three brake calipers associated with one or more axles of the vehicle axle, comprises the following steps:

providing at least one device for detecting the vehicle status;

acquiring a value of vehicle status, or detected value, with said detection device;

comparing the detected value with a reference value of vehicle status, or reference value.

According to another aspect of the invention, a method comprises the further step of proceeding alternatively with one of the following options: if the detected value is less than the reference value, actuating two brake calipers of the at least three brake calipers, or if the detected value is equal to or greater than the reference value, actuating all the at least three brake calipers.

According to one aspect of the invention, a parking brake system of a vehicle comprises:

at least three brake calipers associated with one or more axles of the vehicle;

at least one detection device, configured to detect a value of vehicle status, or detected value;

at least one control unit, operatively connected with said detection device and configured to acquire said detected value.

According to one aspect of the invention, said control unit is configured to compare said acquired value with a reference value.

According to one aspect of the invention, if the detected value is less than the reference value, said control unit is configured to control the actuation of two brake calipers of the at least three brake calipers, or if the detected value is equal to or greater than the reference value, it is configured to control the actuation of all the at least three brake calipers.

DRAWINGS

Further features and advantages of the method and system will become apparent from the description provided below of preferred embodiments thereof, given by way of non-limiting examples, with reference to the accompanying drawings, in which.

DESCRIPTION OF SOME PREFERRED EMBODIMENTS

Figure 1:
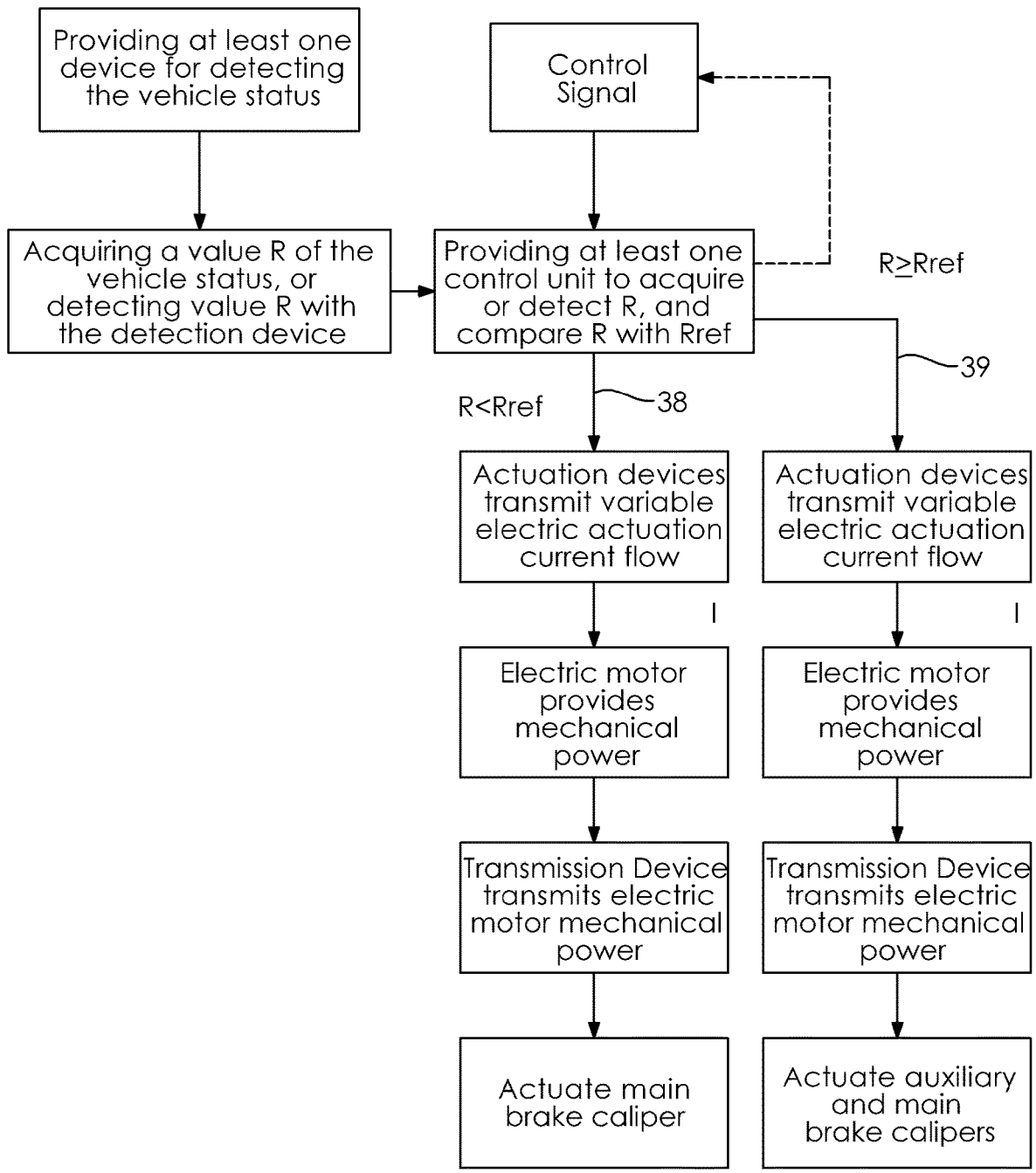
FIG. 1 is a block diagram showing a system according to one embodiment, in which the dotted line shows the optional relations, and also showing certain possible steps of a method according to one operating method.
Figure 2A:
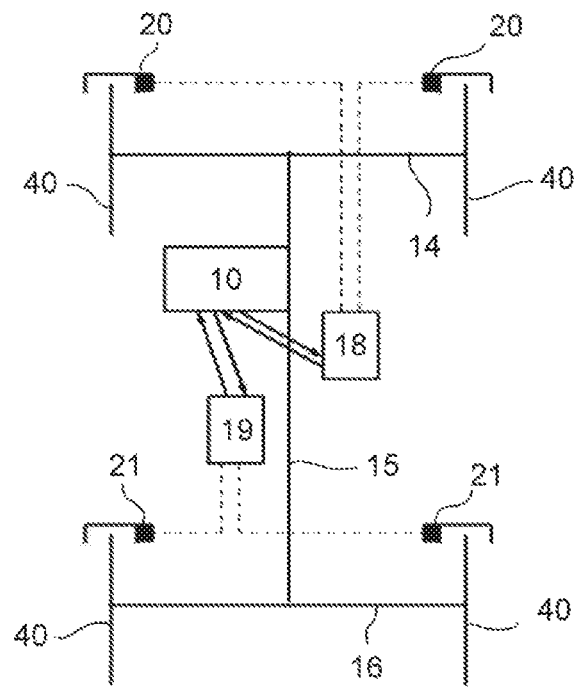
FIGS. 2a, 2b, 3a, 3b, 4a, 4b, 5a and 5b are diagrammatic plan views of a vehicle, which diagrammatically show a system according to certain embodiments, and also certain possible steps of a method, according to certain possible operating methods.
Figure 3A:
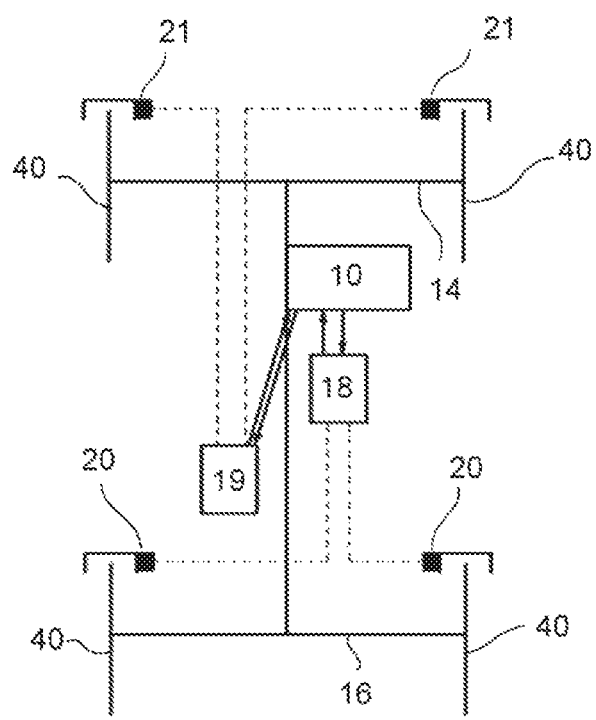
Figure 2B:
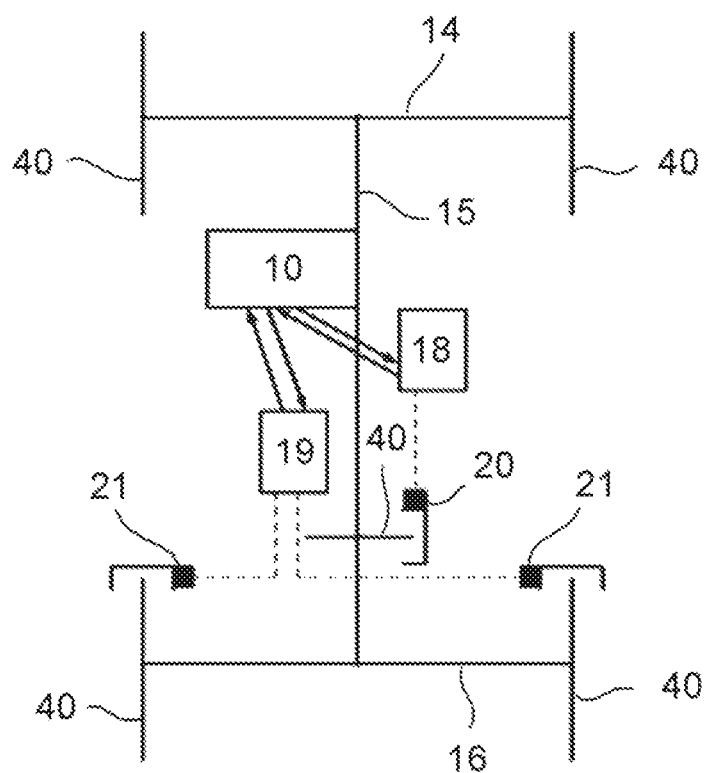
Figure 3B:
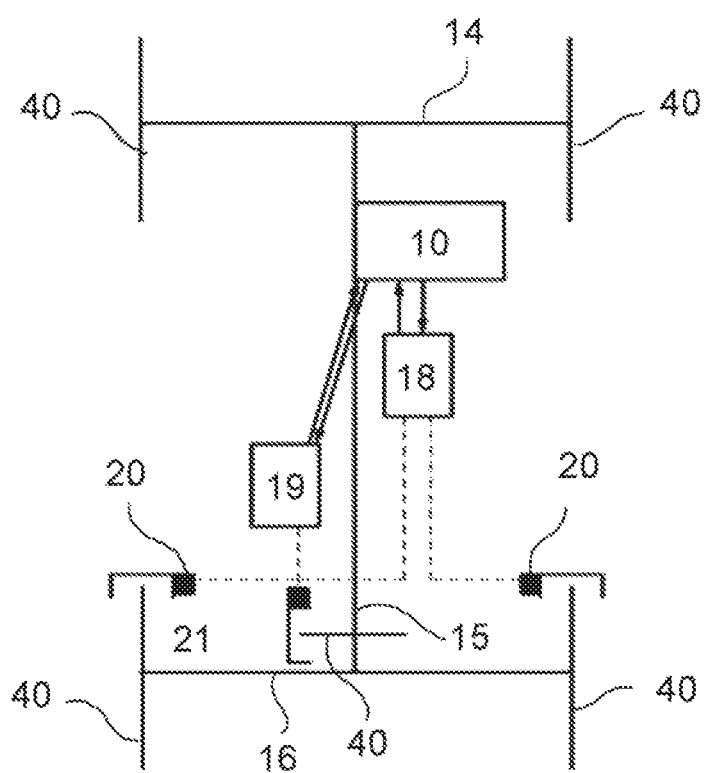
Figure 4A:
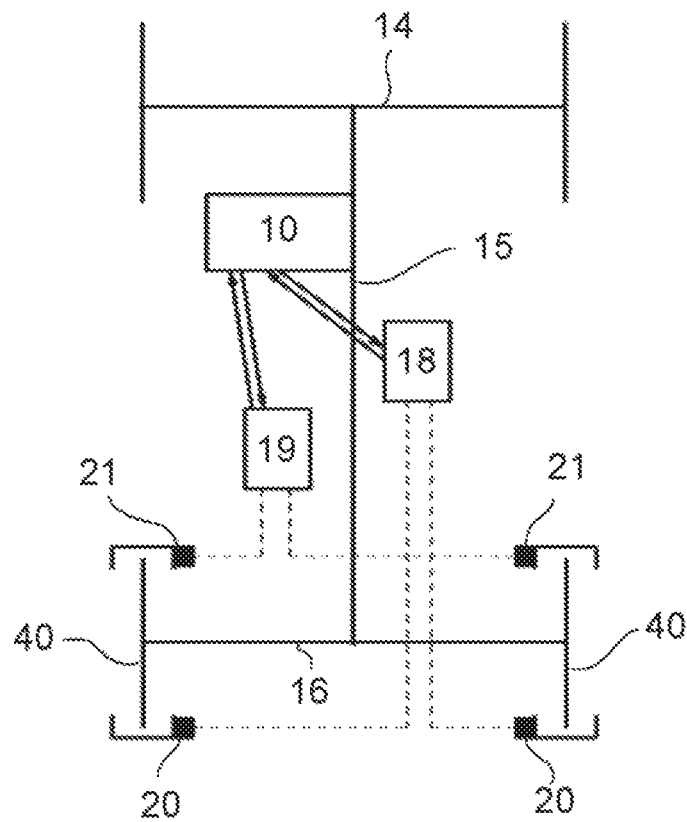
Figure 5A:
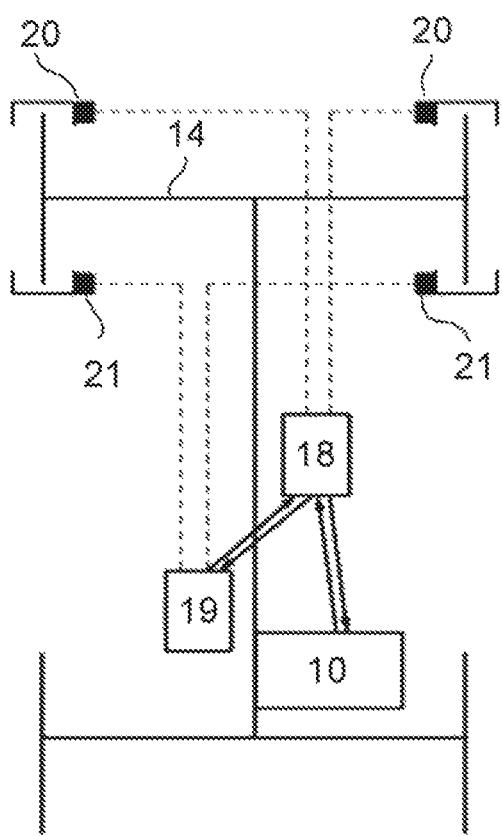
Figure 4B:
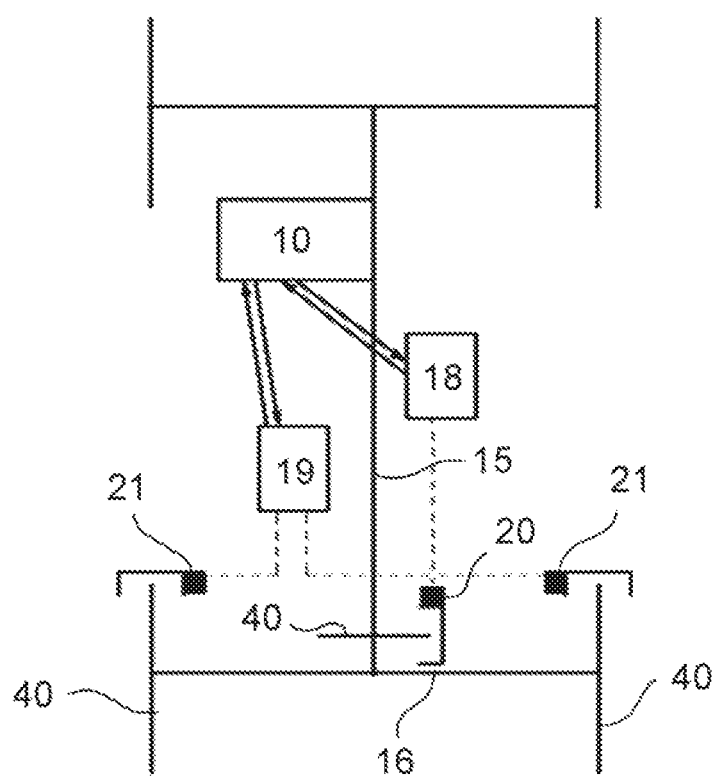
Figure 5B:
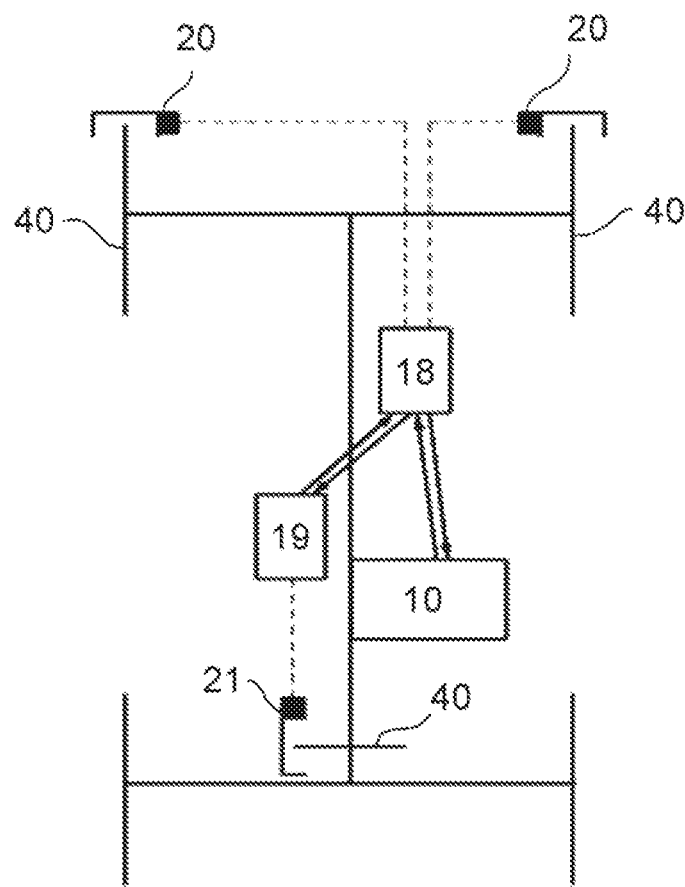
Figure 6:
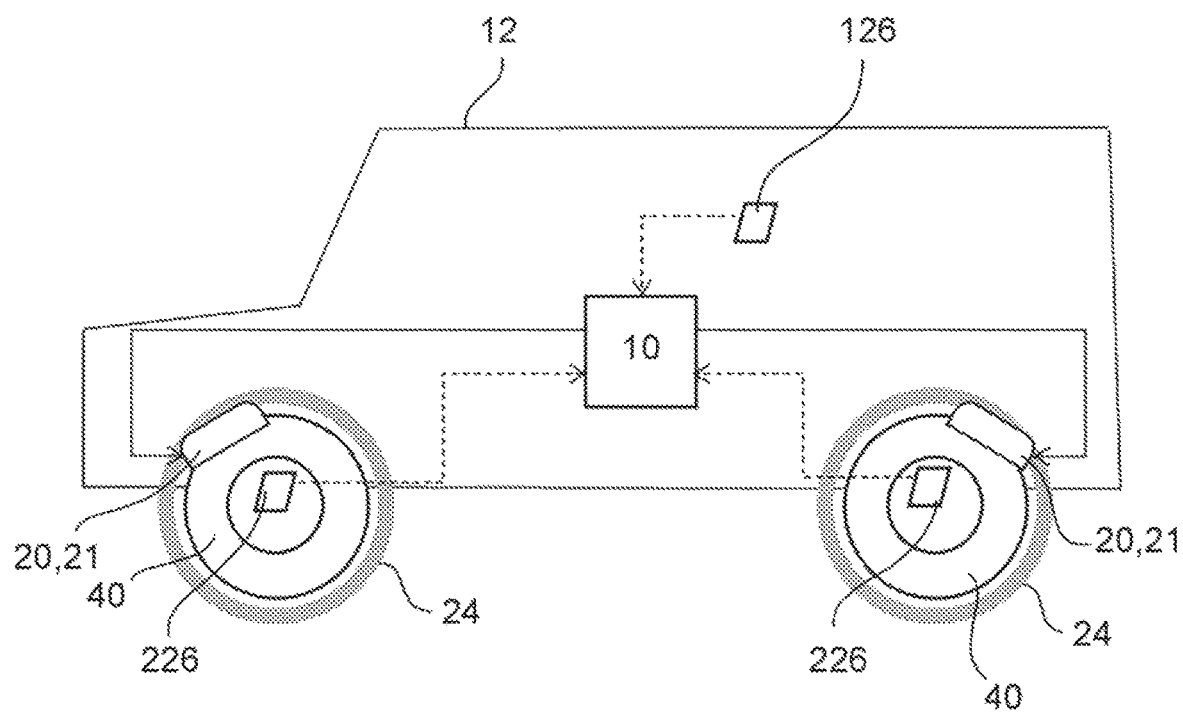
FIGS. 6, 7, 8, 9, 10 and 11 are diagrammatic vertical raised views of a vehicle, which diagrammatically show a portion of system according to certain embodiments, and also certain possible steps of a method, according to certain possible operating methods.
Figure 7:
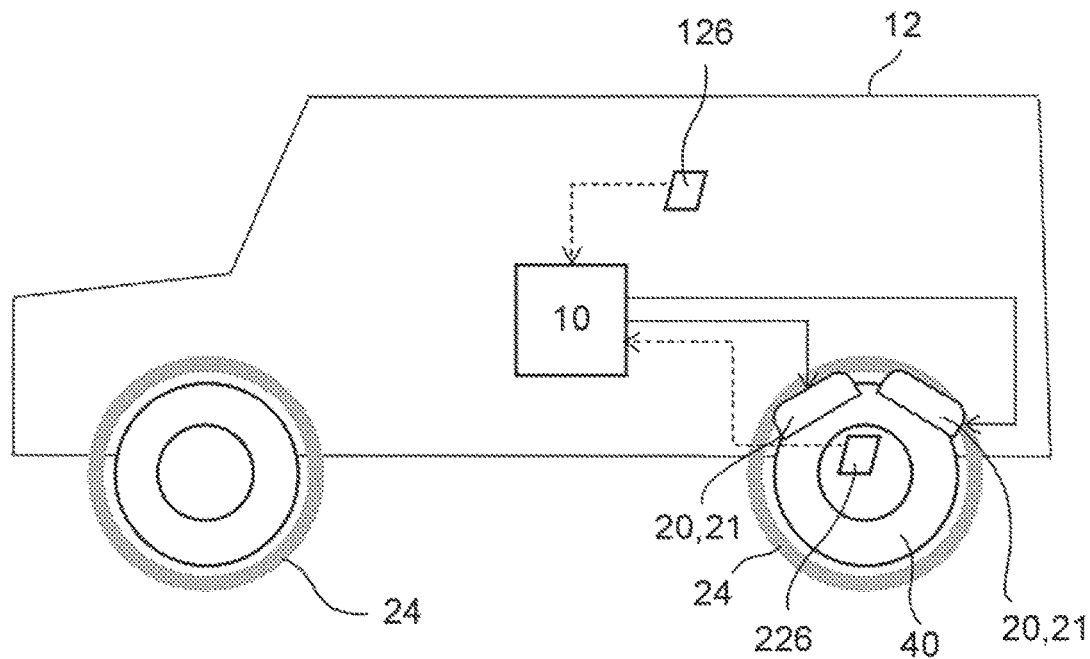
Figure 8:
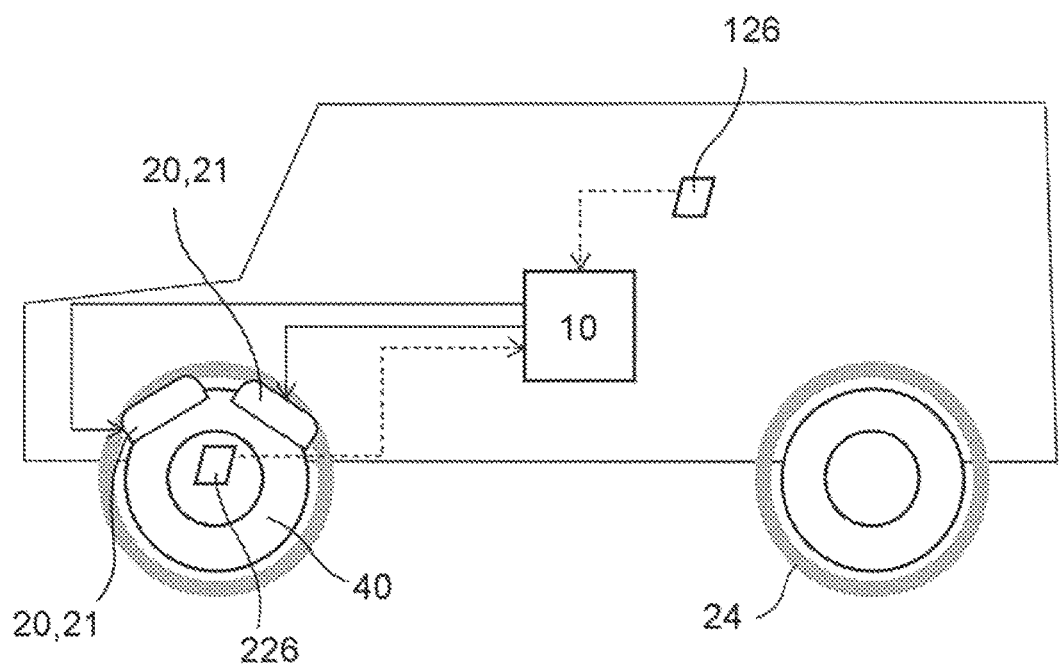
Figure 9:
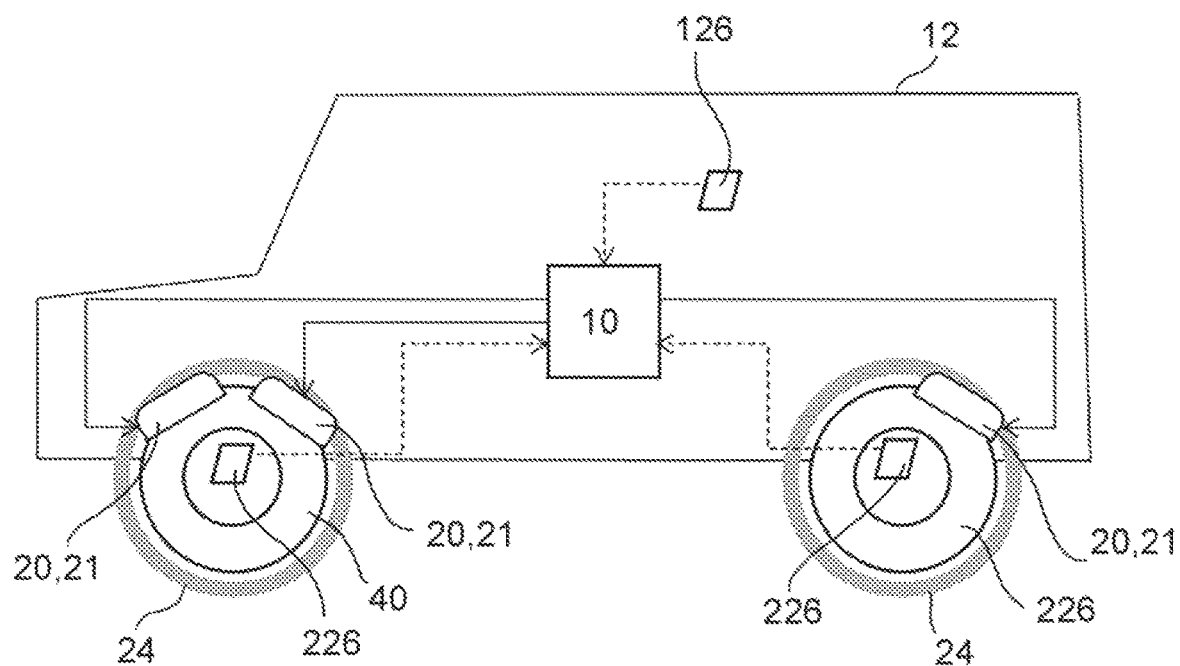
Figure 10:
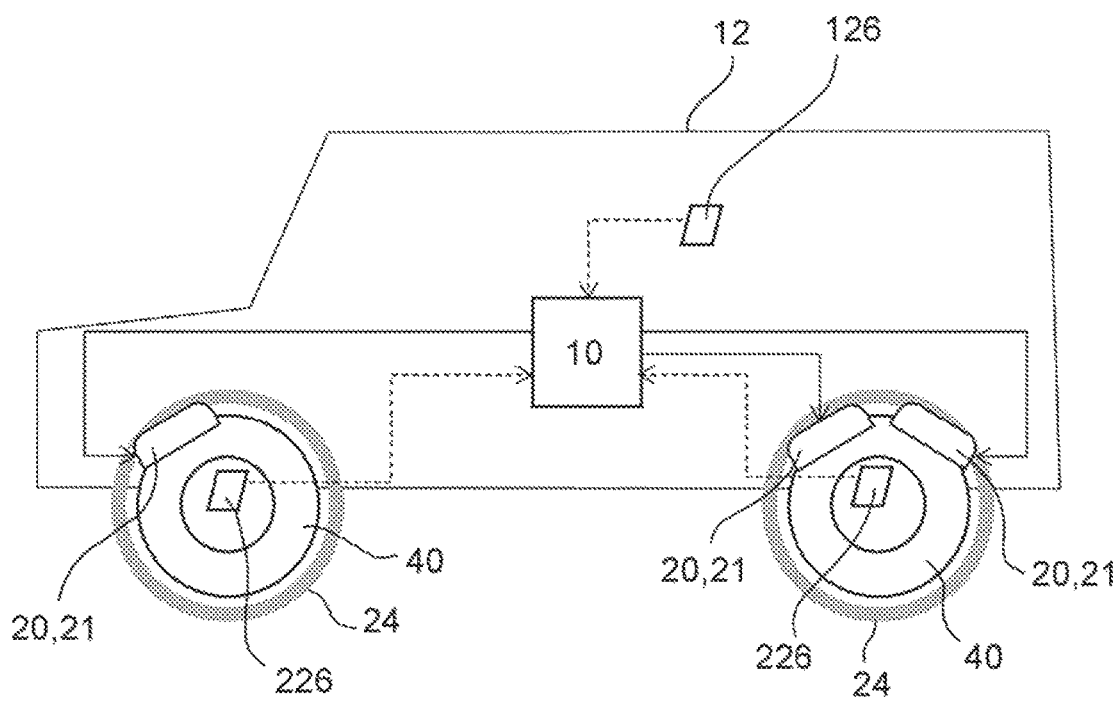
Figure 11:
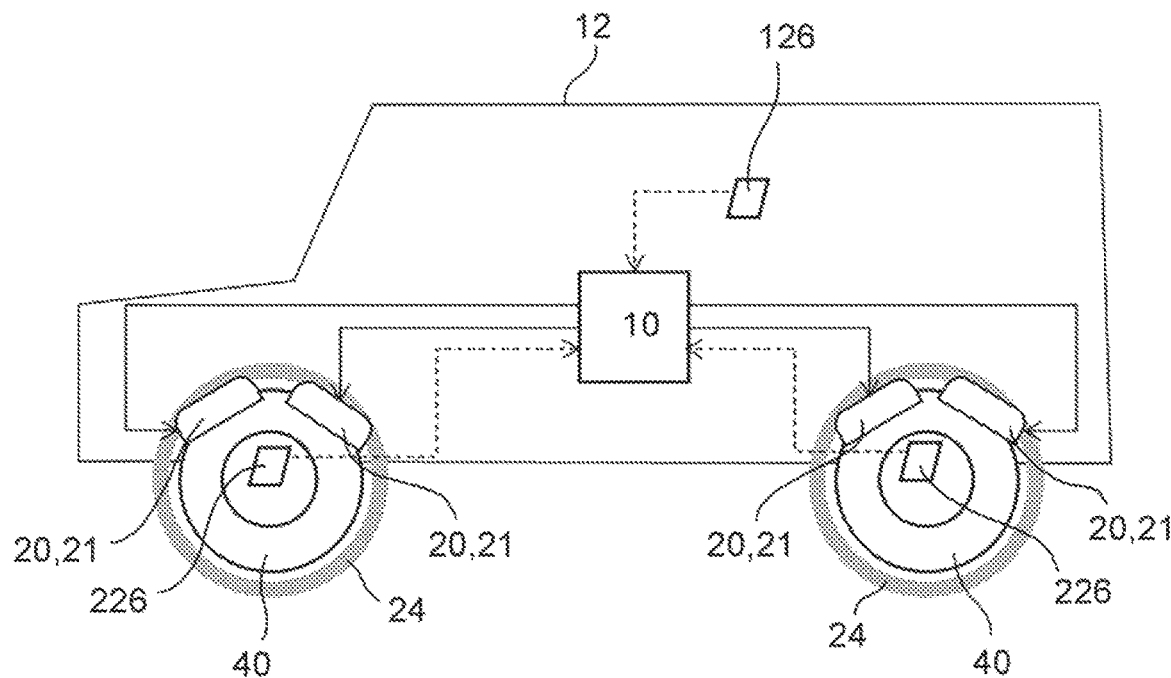
Figure 12:
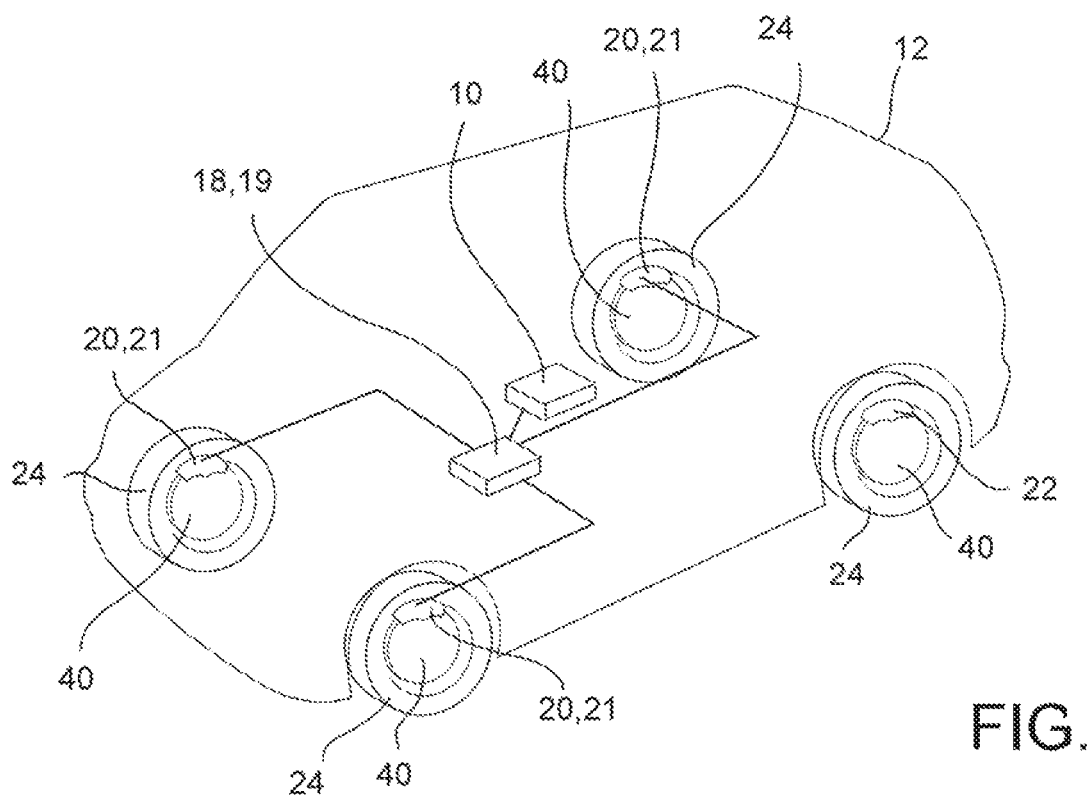
FIGS. 12 and 13 are diagrammatic axonometric views of a vehicle, with transparent sections for clarity, which diagrammatically show a system according to certain embodiments, and also certain possible steps of a method, according to certain possible operating methods.
Figure 13:
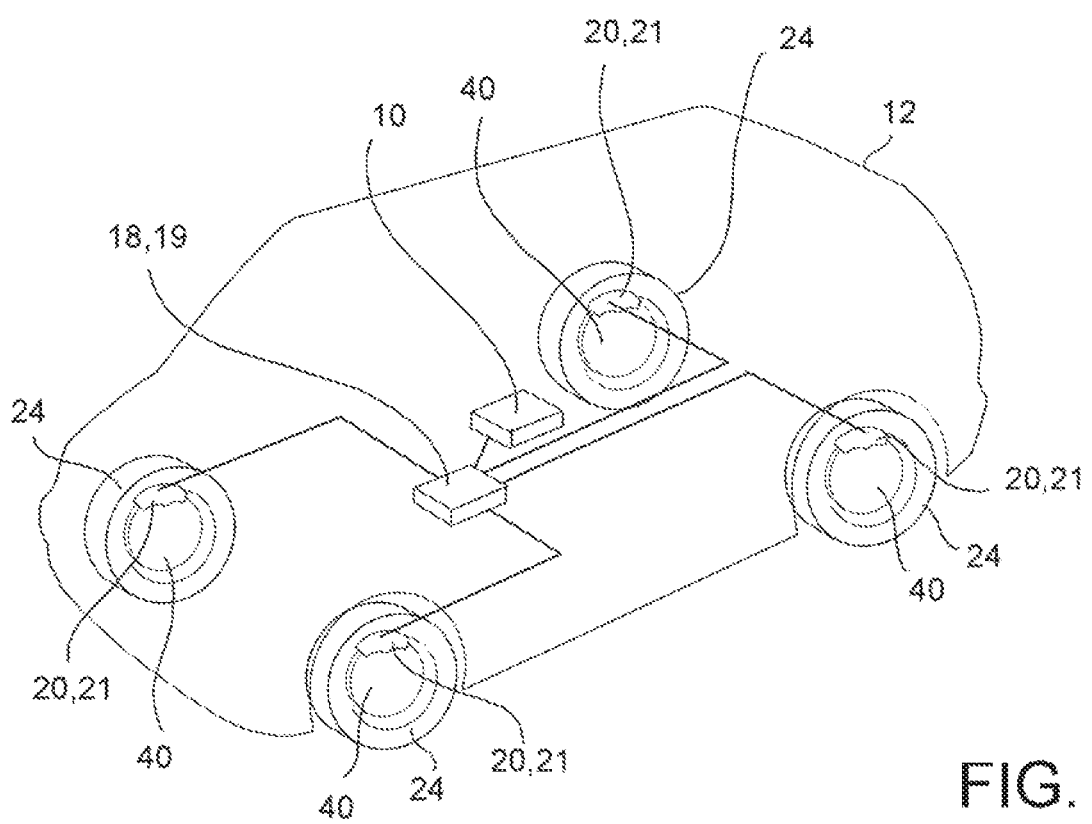

According to a general operating method, a method for actuating a parking brake system of a vehicle 12 comprising at least three brake calipers 20, 21 associated with one or more axles 14, 15, 16 of the vehicle 12, comprises the steps listed below. The term "axle" means an axle of the vehicle, e.g. the front axle 14 or a rear axle 16 of the vehicle, and also the transmission shaft 15 of the vehicle, suitable for being connected to the differential of a vehicle.

Step A. Providing at least one device 26 for detecting the vehicle status.

Step B. Acquiring a value R of the vehicle status, or detected value R, with said detection device 26.

Step C. Comparing the detected value R with a reference value Rref of the vehicle status, or reference value Rref, and proceeding alternatively with one of the options listed below.

If the detected value R is less than the reference value Rref, actuating two brake calipers 20 of the at least three brake calipers 20, 21.

Or, if the detected value R is equal to or greater than the reference value Rref, actuating all the at least three brake calipers 20, 21.

Those skilled in the art will note that such brake calipers 20, 21 comprise first brake calipers 20, or main brake calipers 20, or main calipers 20, which are actuated both if the detected value R is less than the reference value Rref and if the detected value R is greater than the reference value Rref, and at least a second brake caliper 21, or auxiliary brake caliper 21, or auxiliary caliper 21, which is actuated solely if the detected value R is greater than the reference value Rref. The main brake calipers and the at least one auxiliary brake caliper 21 may be structurally indistinguishable from each other and differ only in the logic with which they are actuated. Alternatively, the main brake calipers 20 also may differ structurally from the at least one auxiliary brake caliper 21, for example, the at least one auxiliary brake caliper 21 may be suitable for exerting a smaller braking action with respect to the main calipers 20.

The provision of such a method allows a parking brake system to be provided with an intelligent actuation logic.

The provision of such a method allows the operating safety of the parking brake to be increased.

The provision of such a method allows to increase the safety of a parked vehicle with no driver and potentially even in failure conditions of the parking brake system.

The provision of said auxiliary brake calipers 21 allows to achieve a modular parking brake system, in which one or more auxiliary calipers 21 are incrementally added to the standard main brake calipers 20 until the brake calipers 20, 21 are capable of exerting the desired braking action. Thereby, the costs of sizing the parking brake system are decreased for example, with respect to the costs of a sizing strategy dedicated to the braking system of all vehicles. This is economically advantageous in the case of vehicles with low production volumes.

According to one embodiment, said vehicle 12 may comprise at least one service brake caliper 22, solely suitable for providing a service braking action.

According to a preferred embodiment, the parking brake system comprises at least four brake calipers 20, 21.

When the parking brake system comprises at least four brake calipers 20, 21, after step C, said method includes the following steps.

If the detected value R is less than the reference value Rref, actuating two brake calipers 20 of the at least four brake calipers 20, 21. Or, if the detected value R is equal to or greater than the reference value Rref, actuating all the at least four brake calipers 20, 21.

According to such an embodiment, when the parking brake system comprises at least four brake calipers 20, 21, said at least four brake calipers comprise two main calipers 20 and two auxiliary calipers 21.

According to one embodiment, if the detected value R is equal to or greater than the reference value Rref, said at least one auxiliary caliper 21 is actuated with a time delay with respect to said main calipers 20. Said time delay is of such a length as to avoid the overlapping of the actuation current peak absorbed by said one or more auxiliary brake calipers 21 with the actuation current peak absorbed by said main calipers 20. Thereby, the actuation current absorbed overall by the braking calipers 20, 21 may be decreased with respect to the case in which said main brake calipers 20 and auxiliary calipers 21 are actuated all simultaneously. The provision of said time delay which avoids the overlapping of the actuation current peaks of the brake calipers 20, 21 allows smaller electric wiring to be achieved, the parking braking action dispensed being equal.

According to one embodiment, the parking brake system comprises at least three pairs of brake calipers 20, 21, in which each pair of brake calipers 20, 21 is associated with different brake discs 40 of the same axle 14, 16. When the parking brake system comprises at least three pairs of brake calipers 20, 21, after step C, said method includes the following steps. If the detected value R is less than the reference value Rref, actuating two pairs of brake calipers 20 of the at least three pairs of brake calipers 20, 21. Or, if the detected value R is equal to or greater than the reference value Rref, actuating all the at least three pairs of brake calipers 20, 21.

According to such an embodiment, when the parking brake system comprises at least three pairs of brake calipers 20, 21, said at least three pairs of brake calipers 20, 21 comprise two pairs of main calipers 20 and one pair of auxiliary calipers 21.

Alternatively, when the parking brake system comprises at least three pairs of brake calipers 20, 21, after step C, said method includes the following steps. If the detected value R is less than the reference value Rref, actuating one pair of brake calipers 20 of the at least three pairs of brake calipers 20, 21. Or, if the detected value R is equal to or greater than the reference value Rref, actuating all the at least three pairs of brake calipers 20, 21.

According to such an embodiment, when the parking brake system comprises at least three pairs of brake calipers 20, 21, said at least three pairs of brake calipers 20, 21 comprise one pair of main calipers 20 and two pairs of auxiliary calipers 21.

According to one embodiment, more than one reference value Rref is provided so that the brake calipers 20, 21, or the pairs of brake calipers 20, 21, are actuated incrementally. For example, there may be provided two reference values and if the detected value R is equal to or less than said two reference values, at least one auxiliary brake caliper 21 is actuated, and if the detected value R is greater than the greatest of both said reference values, all the brake calipers 20, 21 are actuated.

According to one embodiment, the parking brake system comprises at least four pairs of brake calipers 20, 21, in which each pair of brake calipers is associated with different brake discs 40 of the same axle 14, 16. When the parking brake system comprises at least four pairs of brake calipers 20, 21, after step C, said method includes the following steps. If the detected value R is less than the reference value Rref, actuating two brake calipers 20 of the at least four pairs of brake calipers 20, 21. Or, if the detected value R is equal to or greater than the reference value Rref, actuating all the at least four pairs of brake calipers 20, 21.

According to such an embodiment, when the parking brake system comprises at least four pairs of brake calipers 20, 21, said at least four pairs of brake calipers 20, 21 comprise two pairs of main calipers 20 and two pairs of auxiliary calipers 21.

According to one embodiment, said brake calipers 20, 21 are associated with the same axle 14, 16 of vehicle 12. For example, said brake calipers 20, 21 may be arranged straddling opposite brake discs 40.

The provision of said brake calipers 20, 21 associated with the same axle 14, 16 allows more than one brake caliper 20, 21 to be associated with the same brake disc 40.

According to one embodiment, the parking brake system comprises at least two brake calipers 20, 21 associated with the same brake disc 40, in which said at least two brake calipers 20, 21 are structurally separate from each other. Thereby, under operating conditions of the vehicle 12, when the parking brake system is not actuated, the brake disc 40 is cooled down more quickly—available parking force being equal—with respect to a parking brake system in which said two brake calipers 20, 21 associated with the same brake disc 40 are structurally connected.

According to one embodiment, said brake calipers 20, 21 are associated with various axles 14, 15, 16 of vehicle 12.

The provision of said brake calipers 20, 21 associated with various axles 14, 15, 16 allows the braking parking action to be exerted on at least three different brake discs 40.

According to one embodiment, said vehicle 12 comprises at least two axles 14, 15, 16. According to one embodiment, said at least two axles comprise at least one forward axle 14, or front axle 14, and at least one rearward axle 16, or rear axle 15. According to one embodiment, said vehicle 12 comprises at least three axles 14, 15, 16. According to one embodiment, said vehicle 12 comprises at least four axles 14, 15, 16.

According to one embodiment, the parking brake system comprises at least three pairs of brake calipers 20, 21, in which each pair of brake calipers 20, 21 is associated with different brake discs 40 of different axles 14, 15, 16.

Thereby, braking simultaneously on various axles 14, 15, 16 is allowed.

According to one embodiment, said vehicle 12 comprises at least two rear axles 16.

According to one embodiment, said one or more axles 14, 15, 16 comprise at least one transmission shaft 15 of the vehicle, connected to a differential of the vehicle.

According to one embodiment, said transmission shaft 15 is connected to at least two axles 14, 16 of the vehicle.

According to one embodiment, each axle 14, 16 is associated with two or more wheels 24.

According to one embodiment, each brake disc 40 is associated with at least one wheel 24. According to one embodiment, each brake disc 40 is associated with at least two wheels 24.

According to one embodiment, said detected value R is a binary signal.

According to one embodiment, the comparison between said detected value R and said reference value Rref is a binary signal.

According to one embodiment, said detection device 26 comprises at least one inclinometer 126, and in which said reference value Rref is a predetermined tilt of vehicle 12. The provision of said inclinometer 126 allows to detect the tilting of vehicle 12. The provision of said inclinometer 126 allows to detect an unevenness between the two axles 14, 16.

According to one embodiment, said inclinometer 126 acquires a value R which comprises information on which of the axles 14, 16 of the vehicle is at the greatest height, or is upstream. According to one embodiment, said inclinometer 126 acquires a value R which comprises information on which of the axles 14, 16 of the vehicle is at the lowest height, or is downstream.

According to one possible operating method, said method comprises the further step of first actuating the brake caliper 20, or the brake calipers 20, 21 arranged further downstream. Thereby, the parking braking of vehicle 12 is optimized because the weight of vehicle 12 which parks on a slope favorably causes the brake caliper 20, 21 arranged further downstream to be capable of exerting an increased braking action with respect to the brake caliper 20, 21 arranged further upstream, structure and size of the brake calipers 20, 21 being equal. Indeed, the braking action of a vehicle is based on the transfer of the braking torque between wheel 24 and the ground; the effectiveness of this transfer increases as the weight force acting on each wheel 24 increases. Those skilled in the art will note that according to this operating method, said brake calipers 20, 21 may comprise one or more main calipers 20 and one or more auxiliary calipers 21.

According to one embodiment, said detection device 26 comprises at least one load sensor 226, and in which said reference value Rref is a predetermined load applied in at least one portion of vehicle 12. Thereby, the parking braking of vehicle 12 is optimized, the brake caliper 20, 21 associated with the portion of vehicle most loaded by the weight of the vehicle itself is capable of exerting an increased braking action with respect to the least loaded brake caliper 20, 21, structure and size of the brake calipers 20, 21 being equal. Those skilled in the art will note that according to this operating method, said brake calipers 20, 21 may comprise one or more main calipers 20 and one or more auxiliary calipers 21.

According to one embodiment, detection device 26 comprises at least one virtual load detector.

According to one embodiment, said load sensor 226 detects the load which weighs on at least one portion of an axle 14, 15, 16. According to one embodiment, said load sensor 226 detects the load which weighs on at least one portion of a wheel 24 of the vehicle.

According to one possible operating method, said method comprises the further step of first actuating the brake caliper 20 or the brake calipers 20 associated with the axle 14, 15, 16 of the vehicle subjected to the greatest load.

According to one embodiment, said detection device 26 comprises at least one movement sensor suitable for detecting if the vehicle is stationary or if the vehicle is in operating conditions. Here, the acquired value R comprises information on the speed of vehicle 12 and the reference value Rref is a speed value greater than zero which is substantially equal to the sensitivity of the movement sensor. Thereby, it may be promptly determined if the main brake calipers 20 are in failure conditions.

According to one possible operating method, said method comprises the further step of first actuating the at least one auxiliary brake caliper 21 when the main brake calipers 20 are in failure conditions.

According to a preferred operating method, said method comprises the step of braking, before step A. According to one operating method, said braking step is carried out by an operator who is on board the vehicle, for example by the driver of the vehicle, by sending a control 100. According to one operating method, said braking step is carried out automatically based on the detected value R detected by said movement sensor of said detection device 26.

According to a general embodiment, there is provided a parking brake system of a vehicle.

Said system comprises at least three brake calipers 20, 21 associated with one or more axles 14, 15, 16 of vehicle 12.

Said system comprises at least one detection device 26, 126, 226 configured to detect a value R of the vehicle status, or detected value R.

Said system comprises at least one control unit 10 operatively connected with said detection device 26, 126, 226 and configured to acquire said value R of the vehicle status, or detected value R.

Said control unit 10 is configured to compare said acquired value R with a reference value Rref.

When the detected value R is less than the reference value Rref, said control unit 10 is operatively connected with two brake calipers 20 of the at least three brake calipers 20, 21 and controls the actuation of said two brake calipers 20, and when the detected value R is equal to or greater than the reference value Rref, it is operatively connected with all the at least three brake calipers 20, and controls the actuation of all said at least three brake calipers 20, 21.

Those skilled in the art will note that such a parking brake system is suitable for implementing the above-described steps of the method.

According to one possible operating method, said method comprises the further step of diagnosing the vehicle status beforehand. Preferably, this step is executed by said control unit 10. Thereby, the presence of vehicle failure conditions may be identified.

As is known, each brake caliper 20, 21 comprises a caliper body suitable for straddling a peripheral edge of at least one brake disc 40, and each brake caliper is suitable for tightening against opposite braking surfaces of the brake disc 40 brake pads conveniently actuated by thrust means for exerting the braking action.

According to one possible operating method, said step C is implemented by said control unit 10 and/or by said detection device 26, 126, 226.

According to one possible operating method, said step B is implemented by said detection device 26, 126, 226.

According to one possible operating method, said braking step is implemented by said control unit 10.

According to one possible operating method, said control unit 10 is actuated when it receives a control 100.

According to one possible operating method, said control unit 10 is configured to actuate said at least one auxiliary caliper 21 with a predefined time delay with respect to the actuation of said main calipers 20.

According to a preferred embodiment, said control unit 10 comprises at least two outlet channels 38, 39, each operatively connected to one or more of said brake calipers 20, 21.

According to one embodiment, said at least two outlet channels 38, 39 comprise a first outlet channel 38 and a second outlet channel 39, in which said first outlet channel 38 is operatively connected to said one or more main calipers 20, and in which said second outlet channel 39 is operatively connected to said one or more auxiliary calipers 21.

According to one embodiment, said at least two outlet channels 38, 39 are independent from each other. In other words, said control unit 10 comprises at least two independent outlet channels 38, 39.

According to one embodiment, said control unit 10 comprises a first control device and a second control device, each comprising one of said two independent outlet channels 38, 39, and in which said first control device is operatively connected to said second control device.

According to one embodiment, said system comprises a plurality of control units 10.

Figure 14A:
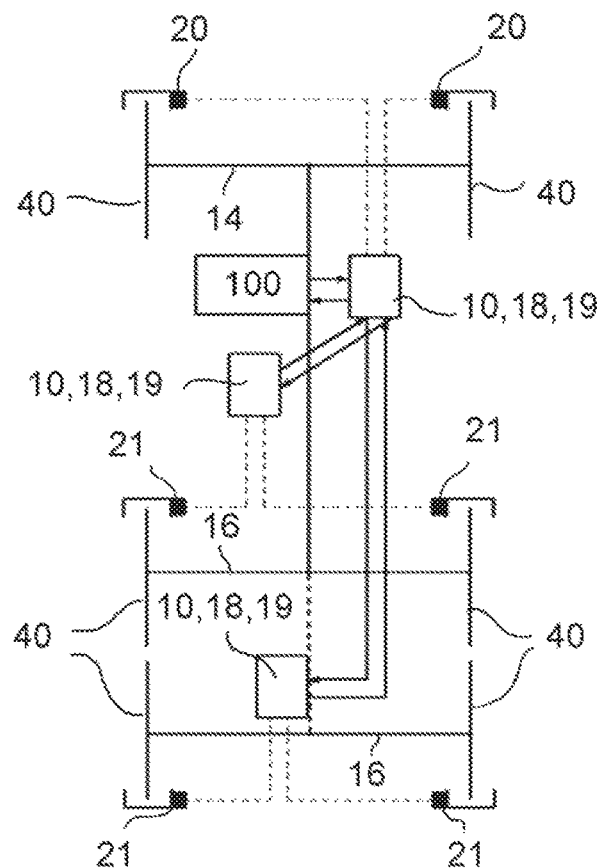
FIGS. 14a, 14b, 15a, 15b, 16a and 16b are diagrammatic plan views of a vehicle, which diagrammatically show a system according to certain embodiments, and also certain possible steps of a method, according to certain possible operating methods.
Figure 15A:
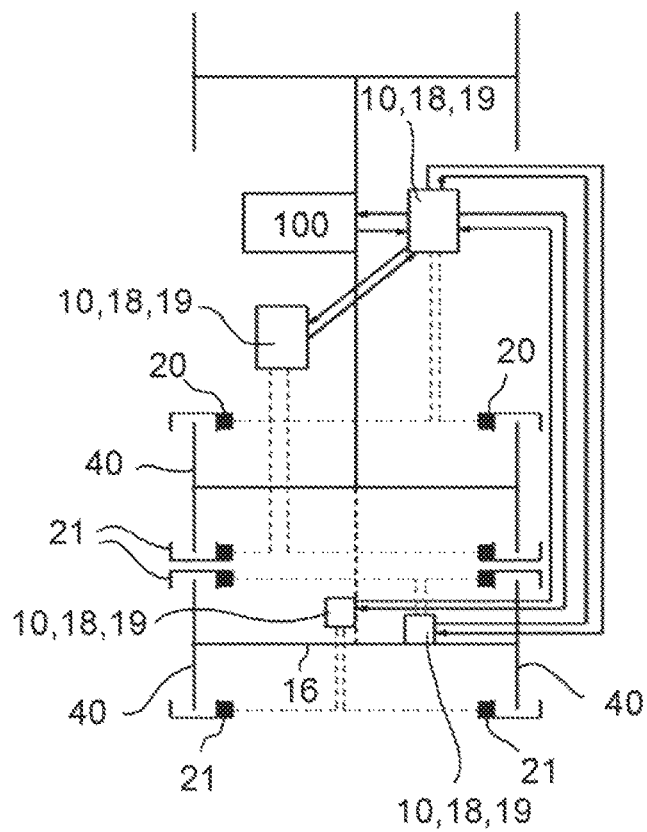
Figure 14B:
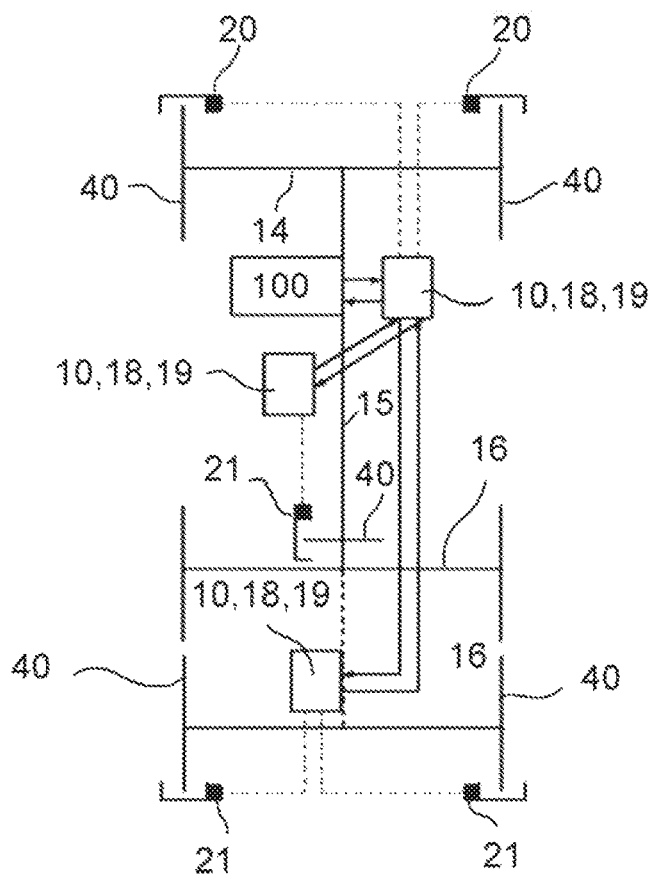
Figure 15B:
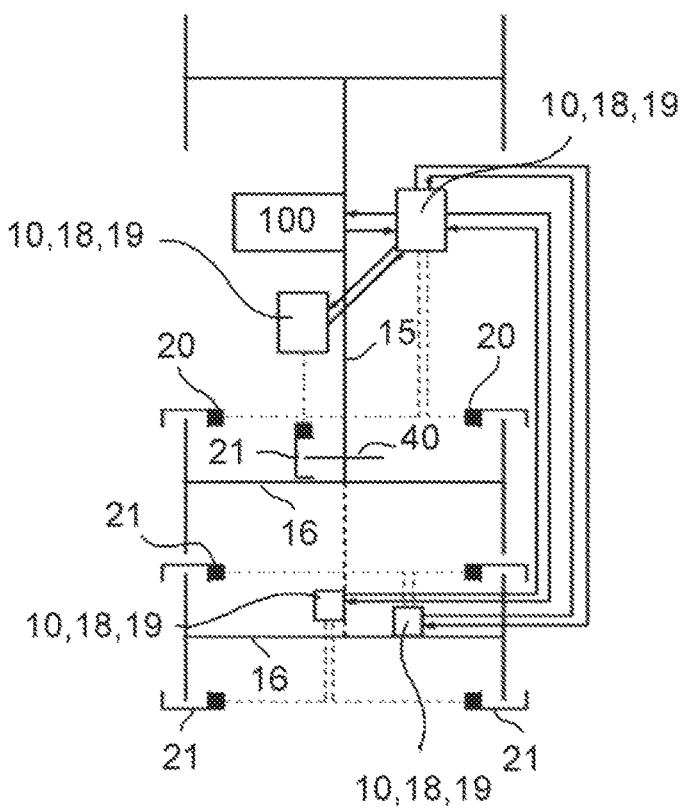
Figure 16A:
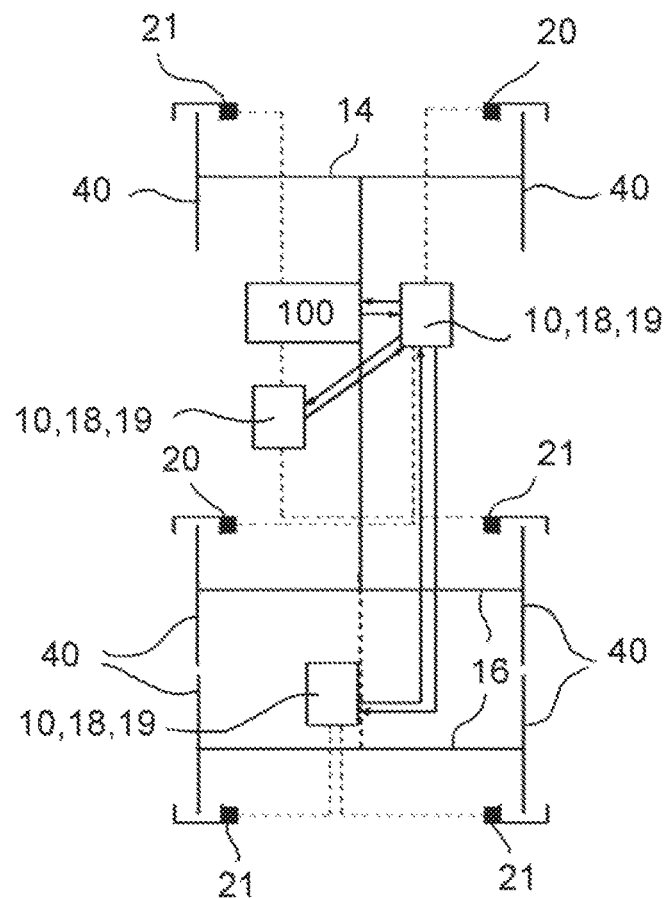
Figure 16B:
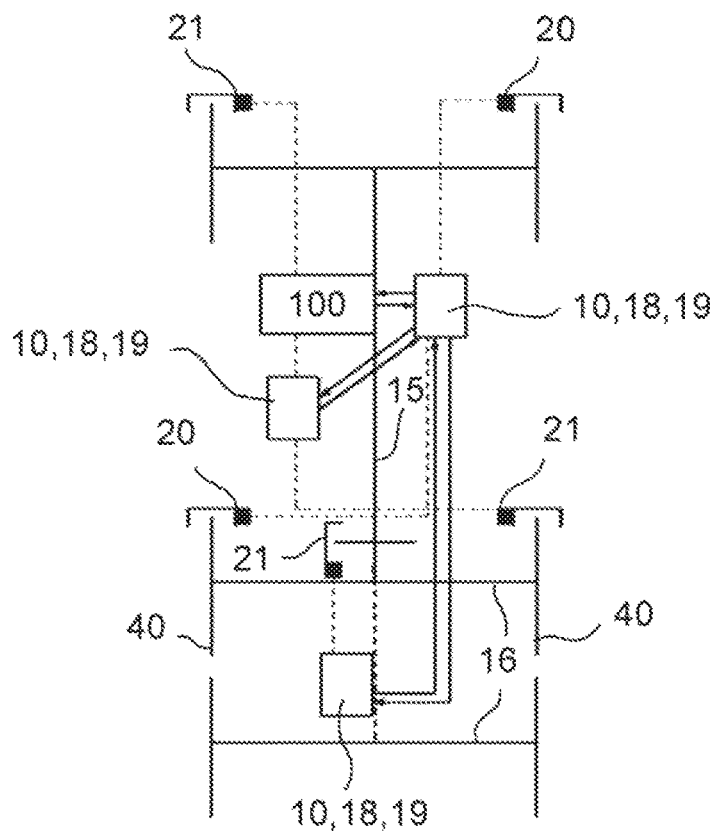

As shown in FIGS. 14a, 14b, 15a, 15b, 16a, 16b, according to one embodiment, said plurality of control units 10 comprises a master control unit and at least one slave control unit, in which said master control unit is configured to transmit control signals to said at least one slave control unit. According to one embodiment, said master control unit is configured to receive signals from said at least one slave control unit, e.g. feedback signals.

According to one embodiment, said system comprises at least two actuation devices 18, 19 operatively connected to said outlet channels 38, 39 of said control unit 10, in which each of said at least two actuation devices 18, 19 is configured to control the actuation of one or more of said brake calipers 20, 21.

According to one embodiment, said control unit 10 is configured to receive feedback signals from at least one of said at least two actuation devices 18, 19.

According to one embodiment, each of said at least two actuation devices 18, 19 is operatively connected to at least one electric motor 28 so as to control the actuation of said at least one electric motor 28. According to one embodiment, said system comprises at least two electric motors 28, each operatively connected to one actuation device 18, 19 of said at least two actuation devices 18, 19.

According to one embodiment, each of said at least two actuation devices 18, 19 transmits a variable electric actuation current flow I to said at least one electric motor 28 so as to obtain a given mechanical power from the electric motor 28.

According to one embodiment, said at least one electric motor 28 transforms the electric actuation current flow I received into mechanical power.

According to one embodiment, said at least one electric motor 28 is integrated in the body of at least one brake caliper 20, 21. Thereby, a minimum number of system components may be obtained.

According to one embodiment, said at least one electric motor 28 is operatively connected to at least one transmission device 30, suitable for transferring the movement generated by the electric motor 28 to at least one brake pad of at least one brake caliper 20, 21.

According to one embodiment, said at least one transmission device 30 transforms the angular movement provided by said electric motor 28 into a translation movement of the associated brake pads.

According to one embodiment, said transmission device 30 comprises at least one drive belt. According to one embodiment, said transmission device 30 comprises at least one cylinder-piston assembly. According to one embodiment, said transmission device 30 comprises at least one screw-cross-head nut assembly.

For example, said one or more control units 10 may be accommodated in the same control unit, or they may be accommodated in various control units. For example, said one or more control units 10 may be accommodated in the same control unit which also accommodates other types of control devices, for example control devices for the service braking such as for example, the ABS control device ("anti-locking brake system") or the ESC control device ("electronic stability control", also known as VSC, ESP, BSM), or the "brake-by-wire" control device.

The present invention is applied in the field of commercial vehicles or industrial vehicles. The present invention also is applied in the field of private vehicles, such as e.g. private cars.

Due to the above-described features provided separately from or together with each other in various embodiments, and also due to the above-described steps provided separately from or together with each other according to various operating methods, the present invention brings the above-mentioned advantages, and in particular:

the danger represented by a parked vehicle with no a driver is reduced with respect to known solutions;

a safe parking braking is also possible under conditions of failure of the parking brake system;

an electrically-operated parking brake system comprising smaller electric wires with respect to known solutions is provided, the park braking action dispensed being equal;

a parking brake system having advantageous installation is also provided on vehicles with low production volumes.

Those skilled in the art may make several changes and adaptations to the above-described embodiments or replace elements with others which are functionally equivalent in order to meet contingent needs without however departing from the scope of the appended claims.

LIST OF REFERENCES

10 Control unit
12 Vehicle
14 Front axle or forward axle
15 Transmission shaft or transmission axle
16 Rear axle
18 First actuation device
19 Second actuation device
20 Main brake caliper or main caliper or first brake caliper
21 Auxiliary brake caliper or auxiliary caliper or second brake caliper
22 Solely service brake caliper
24 Vehicle wheel
26 Detection device
28 Electric motor
30 Transmission device
38 First outlet channel
39 Second outlet channel
40 Brake disc
100 Control
126 Inclinometer
226 Load sensor
R Value of the vehicle status or detected value
Rref Reference value of the vehicle status or reference value
I Electric actuation current flow

The invention claimed is:

1. A method for actuating a parking brake system of a vehicle comprising at least three brake calipers associated with one or more axles of the vehicle, the method comprising the following steps:
    providing at least one detection device for detecting a vehicle status;
    acquiring a value of the vehicle status, or detected value, with said at least one detection device;
    comparing the detected value with a reference value of the vehicle status, or reference value, and proceeding alternatively with one of the following options:
    if the detected value is lower than the reference value, actuate two brake calipers of the at least three brake calipers;
or
    if the detected value is equal to or greater than the reference value, actuate all the at least three brake calipers;
    wherein if the detected value is equal to or greater than the reference value, at least one auxiliary brake caliper is actuated with a time delay with respect to main calipers; and
    wherein said time delay is of a length to avoid overlapping of an actuation current peak absorbed by one or more auxiliary brake calipers with the actuation current peak absorbed by said main calipers.

2. The method of claim 1, wherein the parking brake system of a vehicle comprises at least four brake calipers.

3. The method of claim 1, wherein said brake calipers are associated with the same axle of the vehicle.

4. The method of claim 1, wherein said brake calipers are associated with various axles of the vehicle.

5. The method of claim 1, wherein said at least one detection device comprises at least one inclinometer, and wherein said reference value is a predetermined tilt of the vehicle.

6. The method of claim 5, further comprising the step of first actuating the brake caliper or the brake calipers arranged further downstream.

7. The method of claim 1, wherein said at least one detection device comprises at least one load sensor, and wherein said reference value is a predetermined load applied in at least one portion of the vehicle; and/or wherein said method further comprises the step of:
    first actuating the brake caliper or the brake calipers associated with the portion of the vehicle subjected to the greatest load.

* * * * *